(12) United States Patent
Ness et al.

(10) Patent No.: US 6,374,815 B1
(45) Date of Patent: Apr. 23, 2002

(54) AIR CLEANER BASE ASSEMBLY WITH CRANKCASE BREATHER VENTS

(75) Inventors: Cory A. Ness; Jeffrey D. Border, both of San Leandro, CA (US)

(73) Assignee: Arlen Ness Enterprises, Inc., San Leandro, CA (US)

( * ) Notice: Subject to any disclaimer, the term of this patent is extended or adjusted under 35 U.S.C. 154(b) by 0 days.

(21) Appl. No.: 09/755,913

(22) Filed: Jan. 4, 2001

(51) Int. Cl.[7] .................................................. F02F 7/00
(52) U.S. Cl. ..................................... 123/572; 123/198 E
(58) Field of Search ................................ 123/572, 573, 123/574, 41.86, 198 E (56) References Cited

U.S. PATENT DOCUMENTS

| | | | | |
|---|---|---|---|---|
| 4,011,846 A | * | 3/1977 | Gagliardi | 123/572 |
| 4,066,055 A | * | 1/1978 | Hager | 123/572 |
| 5,233,967 A | | 8/1993 | Peller | |
| 5,937,816 A | | 8/1999 | Wincewicz et al. | |

* cited by examiner

Primary Examiner—Marguerite McMahon
(74) Attorney, Agent, or Firm—Beyer, Weaver & Thomas, LLP (57) ABSTRACT

A combination backing plate and crankcase breather for a motorcycle engine having at least a pair of cylinders, a cylinder head mounted on each cylinder and a valve for connecting each cylinder head to the crankcase for venting the crankcase through an exit port in the cylinder head. The combination includes two hollow bolt alignment members integrally connected by brackets to a support member. The support member includes a venturi air intake, an air cleaner support surface and a backing plate. The backing plate is adapted to allow the support member to be mounted to the air intake of the motorcycle engine. The air intake of the motor cycle engine may be connected to a carburetor or a fuel injection system. The air cleaner support surface is adapted to allow an air cleaner and air cleaner cover to be mounted to the combination. Each bracket includes a conduit that allows blow-by gases vented from the engine through exit ports in the cylinder heads to be conducted to an exit port in the venturi air intake where the blow-by gases are mixed with outside air and recirculated into the engine.

20 Claims, 7 Drawing Sheets

AIR CLEANER BASE ASSEMBLY WITH CRANKCASE BREATHER VENTS

BACKGROUND OF THE INVENTION

This invention relates to relates to motorcycle engines and, more particularly, to air cleaner base assemblies that couple an air cleaner to a carburetor or fuel injection system and provide conduits for venting blow-by gases from the crankcase into a venturi air intake thereof.

As internal combustion engines wear, the annular spaces between the pistons and the cylinder tend to increase. In the combustion chamber of each cylinder, an air-fuel mixture is ignited. The expanding gas mixture forces the piston upwards generating power from the engine. In the expansion process, part of the gas mixture is forced between the annular spaces between the piston and the cylinder into the crankcase. These "blow-by" gases, which also include oil mist and unburned fuel, accumulate in the crankcase and must be vented from the crankcase to the atmosphere to prevent a potentially dangerous pressure build-up in the crankcase.

Pollution control laws and regulations restrict the emissions from internal combustion engines. As exhaust gases from internal combustion engines have become cleaner, the blow-by gases have become a more significant fraction of the total pollution generated from internal combustion engines. In many localities, the pollution control laws and regulations are such that vapors from the crankcase of internal combustion engines must be cleaned prior to discharge into the atmosphere. One method of reducing the pollution associated with the blow by gases is to recycle the gases through the engine. In some four cycle, two cylinder engines manufactured by Harley-Davidson, crank case venting and cleaning is accomplished by a crankcase breather system that conducts blow-by gases from the crankcase to an air cleaner, from which the gases are recirculated back into the engine through the carburetor for burning in the engine cylinders. A crankcase breather system is also used for engines employing a fuel injection system.

By way of example, in the Harley-Davidson four cycle, two cylinder engines each cylinder includes a pair of push rods that extend from the crankcase into the cylinder head for operating the intake and exhaust valves. Each of the push rods is disposed within a hollow push rod tube that communicates with the crankcase (e.g. provide a passageway for blow-by gases in the crankcase). Upper ends of the push rod tubes communicate with a chamber in the middle rocker box of each cylinder head. On each downstroke of the piston in each cylinder, an umbrella valve attached to a center rocker spacer opens, permitting blow-by gases to pass into the middle chamber. From the middle chamber, the blow-by gases are conducted to a second, upper chamber in the rocker box, and thence, via passageways, through a pair of spaced-apart, threaded holes in a right side of the cylinder heads. The threaded holes in combination with hollow bolts enable a stock plastic backing plate to be secured to the cylinder heads. The hollow bolts provide a passageway for the blow-by gases to vent from the holes in the cylinder heads. In a stock version of the Harley Davidson engine with a carburetor, a stock plastic carburetor or backing plate is provided, together with a pair of rubber tubes to conduct the blow-by gases from the hollow bolts to an air cleaner element.

To improve and customize engine performance, many purchasers of Harley Davidson motorcycles owners remove and discard the stock carburetor backing plate, hollow bolts and rubber tubes and replace the system with a substitute crankcase breather system. These substitute crankcase breather systems, for instance, by improving air flow to the engine, can significantly improve the horse power of the engine within certain operational ranges. Examples of substitute crank case breather systems are described in U.S. Pat. No. 5,233,967 by Peller et al. and U.S. Pat. No. 5,937,816 by Wincewicz et al.

In the background Wincewicz et al., the disadvantages of the Peller system are described in detail, such as a large part count and vibration/seal problems. The large part count of the Peller system increases the installation, the manufacturing and the maintenance costs associated with utilizing the system. The vibration/seal problems, however, may cause oil leakage at the joint between the breather system and the cylinder head or air leakage where the system attaches to the carburetor. Such leakage problems are also characteristic of other types of breather systems, as well.

While the breather system of Wincewicz is suitable in most applications, one problem associated with this design is that the blow-by gases, which contain oil and fuel mist, are vented directly into the air cleaner. These blowby gases tend to foul the air cleaner which substantially increases the replacement frequency of the air cleaner. Both the Peller system and the stock Harley-Davidson breather system, incidentally, also suffer from this fouling problem. Another disadvantage of the Wincewicz system is that the blow-by gases are vented from the cylinder heads in a manner where they may interfere with one another. Since the blow-by gases are vented into a common communication channel, the portions vented during the piston downstroke in one cylinder, can interfere with outflow of blow-by gases from the other cylinder during its piston upstroke.

Accordingly, it would be desirable to provide a crank case breather system that is easy to install, utilizes a minimum number of components, eliminates airflow interference effects, preserves air cleaner performance and minimizes seal leakage problems.

SUMMARY OF THE INVENTION

This invention addresses the needs indicated above by providing a combination backing plate and crankcase breather for a motorcycle engine having at least a pair of cylinders, a cylinder head mounted on each cylinder and a valve for connecting each cylinder head to the crankcase for venting the crankcase through an exit port in the cylinder head. The combination includes two hollow bolt alignment members integrally connected by brackets to a support member. The support member includes a venturi air intake, an air cleaner support surface and a backing plate. The backing plate is adapted to allow the support member to be mounted to the air intake of the motorcycle engine. The air intake of the motor cycle engine may be connected to a carburetor or a fuel injection system. The air cleaner support surface is adapted to allow an air cleaner and air cleaner cover to be mounted to the combination. Each bracket includes a conduit that allows blow-by gases vented from the engine through exit ports in the cylinder heads to be conducted to an exit port in the venturi air intake where the blow-by gases are mixed with outside air and recirculated into the engine.

One aspect of the present invention provides an air cleaner base assembly for a motorcycle engine including at least one cylinder head having a communication port for venting a crankcase, an air cleaner and an air intake port of a fuel system. The base assembly can be generally characterized as including: 1) an air cleaner support member having a first side positioned adjacent the air intake port and an opposite second side adapted to seat the air cleaner thereto, the support member further including a venturi portion defining an intake aperture extending from the second side to the first side, and having a transverse cross-sectional dimension substantially similar to that of the air intake port of the fuel system for air flow from the air filter, through the intake aperture and into the air intake port; and 2) a flange member mounted to the support member, and adapted to mount said support member to the cylinder head, the flange member defining a communication conduit extending therethrough, and having an entrance port in flow communication with the communication port of the cylinder head and an opposite exit port terminating at the venturi portion.

In particular embodiments, the flange member may further define a bolt alignment passage formed for coaxial alignment with the communication port of the cylinder head when mounted thereto. Thus, the base assembly may include a bolt member extending through the bolt alignment passage and the communication port to mount the air cleaner support member to the cylinder head. In addition, the communication conduit of the flange member may intersect the bolt alignment passage at the entrance port thereof and the bolt member may be configured to enable fluid communication between the communication port of the cylinder head and the entrance port of the communication conduit of the flange member. Further, the bolt member may include a flow passage extending through a shaft portion thereof to provide flow communication between the communication port and the entrance port where the flow passage of the bolt member may include a first opening terminating at a distal end of the shaft, and a second opening terminating at a side portion of the shaft proximate the communication conduit entrance port when the base assembly is mounted to the cylinder head. The longitudinal axis of the communication conduit may intersect the longitudinal axis of the bolt alignment passage at an angle of between about 30° to about 60°.

In other embodiments, the flange member may include a bolt contact surface surrounding one end of the bolt alignment passage, and formed to forcibly engage a head portion of the bolt member during the mount and the base assembly may further include a first seal device cooperating with the head portion of the bolt and the contact surface to form a fluid tight seal there between during the mount. The first seal device may be provided by an O-ring disposed in an annular groove inset in the bolt contact surface and encircling the one end of the alignment bolt passage. Further, the flange member may include a cylinder head contact surface surrounding an opposite end of the bolt alignment passage, and formed to forcibly engage a sealing surface of the cylinder head during the mount. Therefore, the base assembly may include a second seal device cooperating with the cylinder head contact surface and the sealing surface of the cylinder head to form a fluid tight seal therebetween during the mount. In addition, the first seal device may be provided by an O-ring disposed in an annular groove inset in the bolt contact surface and encircling the one end of the alignment bolt passage, and the second seal device may be provided by an O-ring disposed in an annular groove inset in the cylinder head contact surface and encircling the opposite end of the alignment bolt passage In yet other embodiments, a second flange member, spaced-apart from the first named flange member, mounted to the support member, and adapted to mount the second support member to a second cylinder head of the motorcycle, the second flange member defining a communication conduit extending therethrough, and having an entrance port in flow communication with a communication port of the second cylinder head for venting the crankcase, the communication conduit also including an opposite exit port terminating at the venturi. Each flange member may define a respective bolt alignment passage formed for coaxial alignment with the corresponding communication port of the corresponding cylinder head when mounted thereto. In additon, the base assembly may include a respective bolt member extending through the respective bolt alignment passage and respective communication port to mount the air cleaner support member to the respective cylinder head. In addition, each communication conduit of the respective flange member may intersect the respective bolt alignment passage at the respective entrance port thereof and each bolt member may be configured to enable fluid communication between the respective communication port of the respective cylinder head and the entrance port of the communication conduit of the respective flange member. The longitudinal axis of the respective communication conduit may intersect the longitudinal axis of the respective bolt alignment passage at an angle of between about 30° to about 60°.

In another embodiment, each flange member may include a bolt contact surface surrounding one end of the respective bolt alignment passage, each bolt contact surface being formed to forcibly engage a head portion of the respective bolt member during the mount. Thus, the base assembly may further include a respective first seal device cooperating with the respective head portion of the corresponding bolt member and the respective contact surface to form a fluid tight seal therebetween during the mount. Further, each flange member may include a respective cylinder head contact surface surrounding an opposite end of the respective bolt alignment passage, each cylinder head contact surface being formed to forcibly engage a respective sealing surface of the respective cylinder head during the mount. Therefore, the base assembly may include a respective second seal device cooperating with the respective cylinder head contact surface and the respective sealing surface of the corresponding cylinder head to form a fluid tight seal therebetween during the mount.

Another aspect of the present invention provides a combination backing plate and crankcase breather assembly for a motorcycle engine having at least a first and a second cylinder, a cylinder head mounted on each cylinder, means for connecting the cylinder heads to the crankcase for venting the crankcase through an exit port on each cylinder head, an air intake port of a fuel system and an air cleaner. The assembly may be generally characterized as including: 1) a support member having a first side adapted to mount to the engine air intake, and an opposite second side adapted to seat the air cleaner thereto where support member may includes a venturi portion defining a centrally disposed intake aperture with a transverse cross-sectional shape substantially identical to a transverse-cross-sectional shape of the engine air intake, 2) securing structure configured to secure the air cleaner to the support member; 3) a pair of flange members each integrally connected to the support member and formed to mount the assembly to the cylinder heads, each integrally connected to one hollow bolt alignment member, each flange member defining a respective communication conduit extending therethrough, and each communication conduit having an entrance port in flow communication with a respective communication port of the corresponding cylinder head and an opposite exit port terminating at the venturi portion such that each communication conduit vents gases from the crankcase through the exit ports of the respective cylinder head to the corresponding exit port at the venturi portion; 4) a pair of hollow bolt members each adapted to releasably mount a respective flange member to the corresponding cylinder head, each bolt member including a flow passage coaxially aligned with the corresponding exit port of cylinder head when the bolt member is fastened in the respect exit port; and 5) respective sealing devices cooperating with at least one of the respective hollow bolt members and the respective flange members to fluid seal the respective communication conduit to the respective exit port.

These and other features of the present invention will be presented in more detail in the following detailed description of the invention and the associated figures.

DESCRIPTION OF THE PREFERRED EMBODIMENTS

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Referring now to FIGS. 2–5B, an air cleaner base assembly with crankcase breather vents, generally designated 100, is provided for a motorcycle engine 5 including at least one cylinder head 12 or 14 having a communication port 18 or 20 for venting a crankcase 10. The motorcycle engine 5 further includes an air cleaner 40 and an air intake port 21 of a fuel system 22. The base assembly 100 includes an air cleaner support member 130 having a first side (FIGS. 3 and 5A) positioned adjacent the air intake port 21 and an opposite second side (FIGS. 4 and 5B) adapted to seat the air cleaner 40 thereto. The support member 130 further includes a venturi portion 104 defining an intake aperture 110 extending from the second side to the first side. A transverse cross-sectional dimension of the intake aperture 110 is substantially similar to that of the air intake port 21 of the fuel system 22 for air flow from the air cleaner 40, through the intake aperture 110 and into the air intake port 21. The cleaner base assembly further includes at least one flange member 113 or 115 mounted to the support member 130 which is adapted to mount the support member to a respective cylinder head 12 or 14. Each flange member 113 or 115 defines a communication conduit 170, 171 extending therethrough, and having a respective entrance port 172, 173 in flow communication with the corresponding communication port 18, 20 of the cylinder head 12 or 14 and an opposite exit port 174, 175 termninating at the venturi portion 104.

Accordingly, the air cleaner base assembly with crankcase breather vents of the present invention functions both as a support to mount and seat the air cleaner and as a crankcase breather device to vent blow-by gases from the crankcase directly into the venturi portion of the base assembly just prior to the air intake of the fuel system. The strategic location of these exit ports of the communication conduits at the venturi portion enable direct venting of the blow-by gases into the air intake of the fuel system (i.e., the carburetor of fuel injection system). Such direct venting minimizes fouling of the components (E.g., the air cleaner) by residual oil and unburned fuel contained in the blow-by gases.

Figure 1:
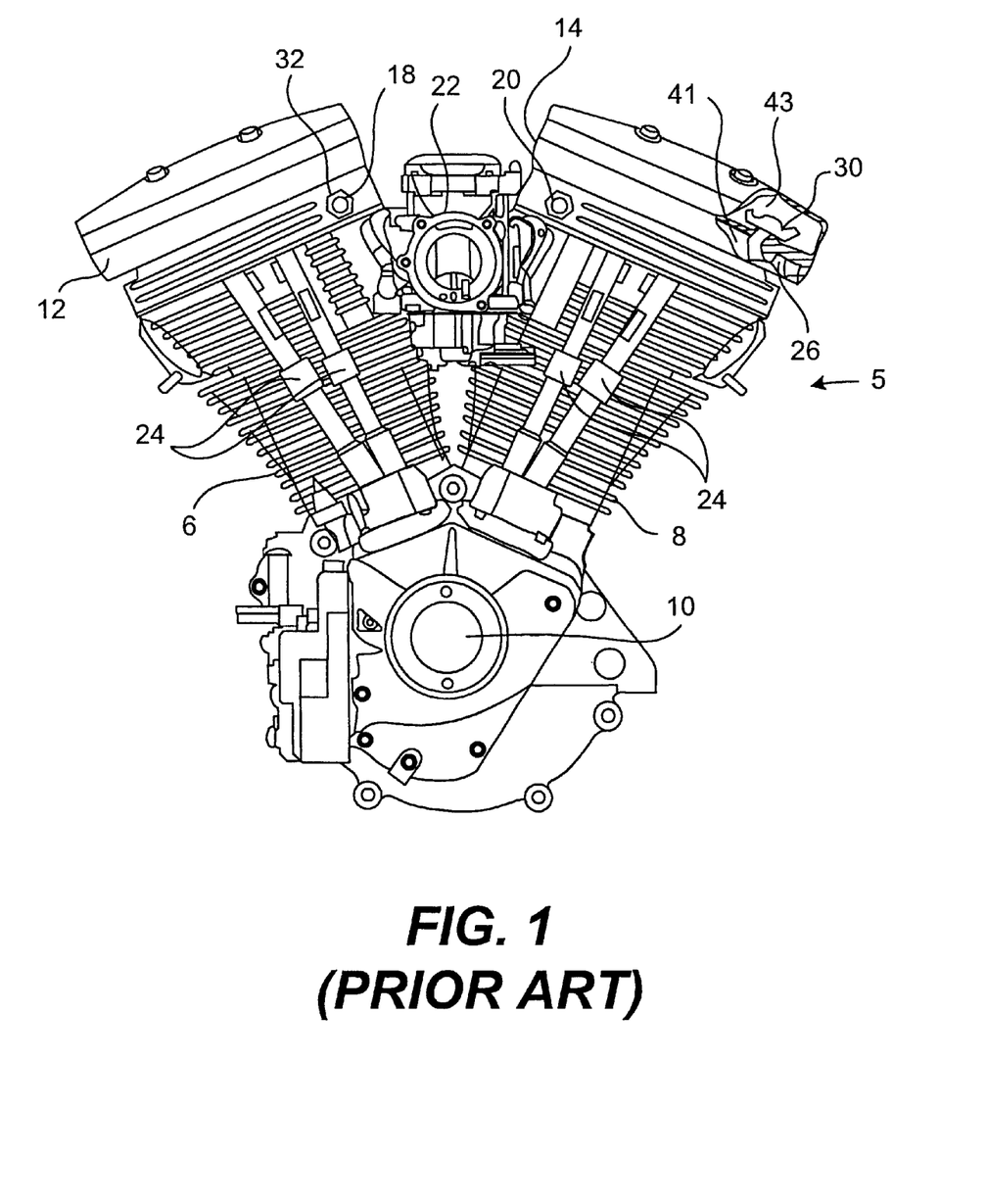
FIG. 1 is a side elevation view of a right side of a prior art two cylinder motorcycle engine with the air cleaner and the carburetor backing plate removed.

Briefly, referring now to FIG. 1, a side elevation view of a right side of a four cycle, two stroke motorcycle engine with the air cleaner and the carburetor backing plate removed. The engine 5 has a crankcase 10, a pair of cylinders 6, 8, and a pair of cylinder heads 12, 14 located at upper ends of the cylinders 6, 8. Each cylinder 6, 8 has a pair of hollow push rod tubes 24 with push rods (not shown) disposed inside of the push rod tubes 24. The hollow push rod tubes 24 extend from the crankcase 10 into the cylinder heads 12 and 14. A lower end of each push rod tube 24 communicates with the crankcase 10 and an upper end of each tube 24 communicates with a first, lower chamber 41 within a middle rocker box section 26 in the cylinder heads 12 and 14, providing a conduit for venting gases from the crankcase.

The push rods (not shown) operate cylinder intake and exhaust valves (not shown). An umbrella valve 30 opens on each piston downstroke in each cylinder 6 and 8, thereby permitting blow-by gases to move from the lower chamber 41 to a second, upper chamber 43 in the rocker box 26. Various chambers (not shown) in the rocker box 26 provide a conduit to a threaded hole or exit port, 18 and 20, on a right side of each cylinder head, 12 and 14, respectively. A land 32, 33 is formed in each cylinder head, 12 and 14, in surrounding relation to the exit ports 18, 20.

In a stock Harley-Davidson breather system (not shown), hollow threaded bolts may secure a combination plastic carburetor backing plate and air intake system to the cylinder heads, 12 and 14, via the threaded communication ports 18 and 20. The hollow threaded bolts may include a nipple on an end opposite the end secured to the threaded communication ports 18 and 20. The nipple may be used to secure a hose to the hollow bolts. A first side of the carburetor backing plate is secured to the fuel system 22 (e.g., a carburetor 22) using attachment means. A gasket is typically disposed between the carburetor backing plate and the carburetor 22 to provide a seal between the carburetor backing plate and the carburetor 22. On a second side of the carburetor backing plate opposite the carburetor side, an air cleaner may be secured using attachment means to the combination air intake system and carburetor backing plate. The air cleaner may include two hollow rubber hoses with first ends fixed near the outer diameter of the air cleaner in communication with the interior of the air cleaner. The opposite ends of the hollow rubber tubes may be attached to the hollow threaded bolts attached to the threaded communication ports 18 and 20 providing a conduit for blow-by gases from the cylinder heads 12, 14 to the air cleaner. A metal cover with a gasket may be secured to the combination air intake system and carburetor backing plate with attached air cleaner proving a cover to the air cleaner. During operation of the engine, outside air enters the air intake system via an intake port 21 in the combination backing plate and circulates through the air cleaner preferably removing dust or other contaminants from the outside air. The outside air potentially mixes with blow-by gases vented from the communication ports 18 and 20 in the cylinder heads 12, 14 which are conducted to the air cleaner via the hollow bolts and rubber tubes connected to the air cleaner. The mixture of filtered air and blow-by gases enters the carburetor and is mixed with fuel for burning in the engine.

Figure 2:
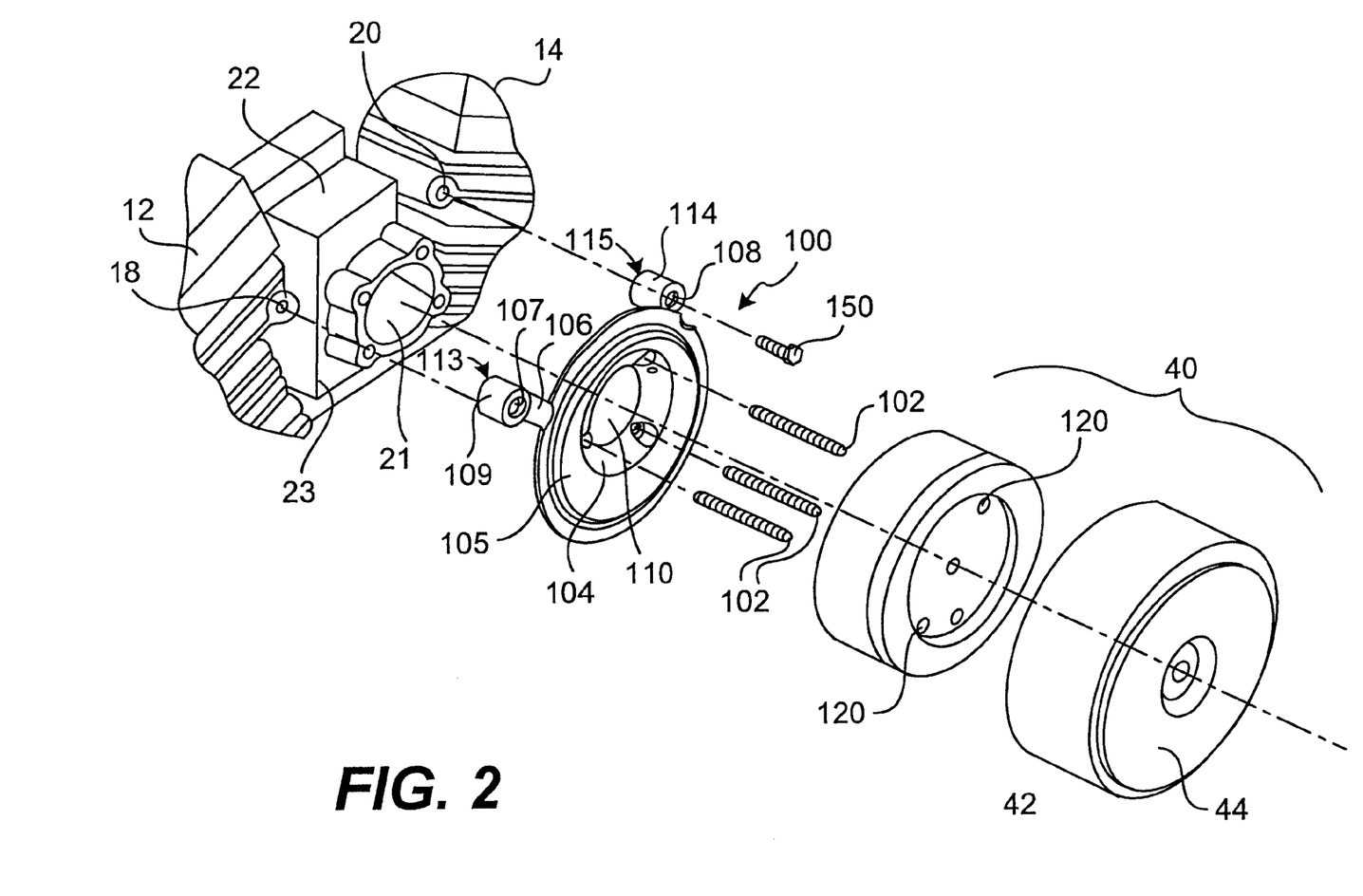
FIG. 2 is a fragmentary, exploded, top perspective view of the engine illustrated in FIG. 1 together with the air cleaner support assembly backing plate and crankcase breather assembly constructed in accordance with the present invention.

FIG. 2 is a fragmentary, top perspective view of the engine 5 illustrated in FIG. 1 together with an exploded perspective view of the air cleaner support assembly 100 of the present invention. An air cleaner 40 comprising an air filter 42 and air cleaner cover 44 may be secured to the air cleaner support assembly 100 through attachment bolts 102, to be described in greater detail below. Referring now to FIGS. 3–7, it may be seen that each flange member 113, 115 of the assembly 100 includes two cylindrical bolt alignment members 109, 114 integrally connected to the support member 130, via two brackets 106, 112. The two cylindrical bolt alignment members 109, 114, brackets 106, 112 and support member 130 may be integrally cast using aluminum or any other appropriate material.

Figure 5A:
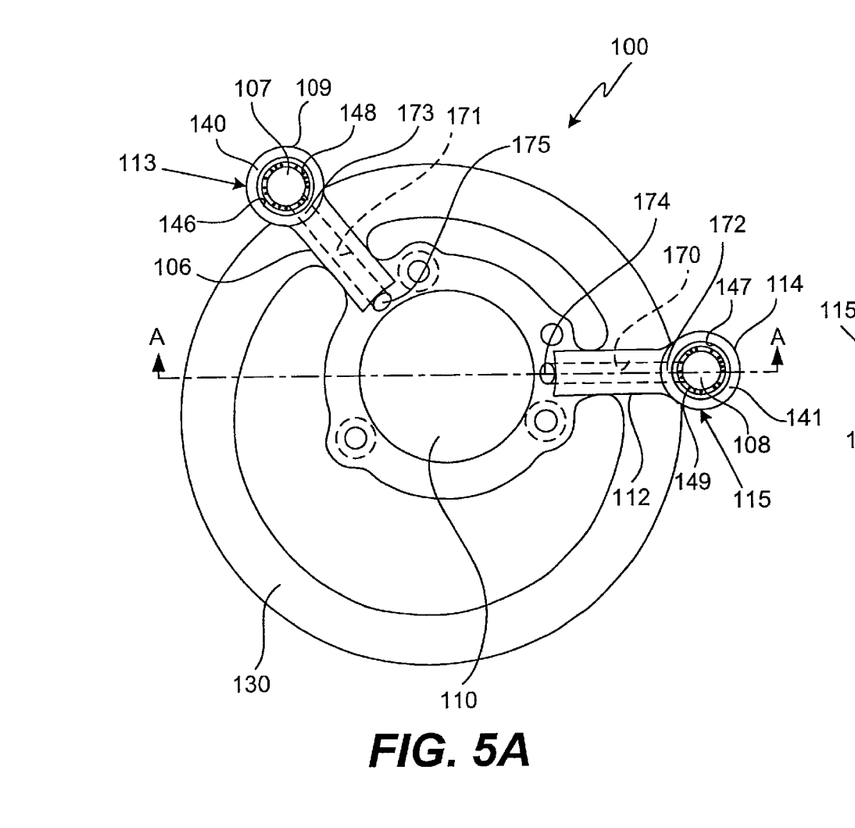
FIG. 5A is a reduced rear elevation view of the support member of FIG. 3.
Figure 5B:
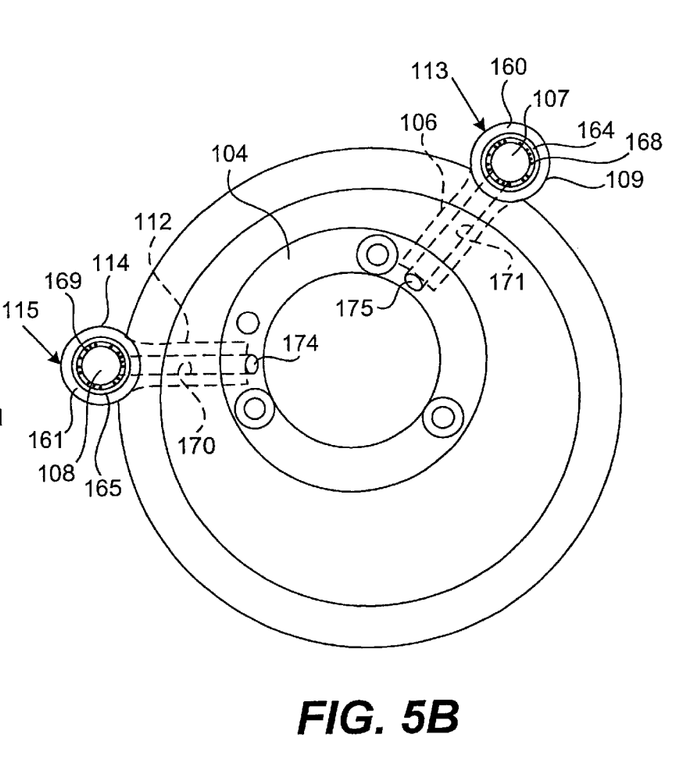
FIG. 5B is a reduced front elevation view of the support member of FIG. 3.
Figure 6:
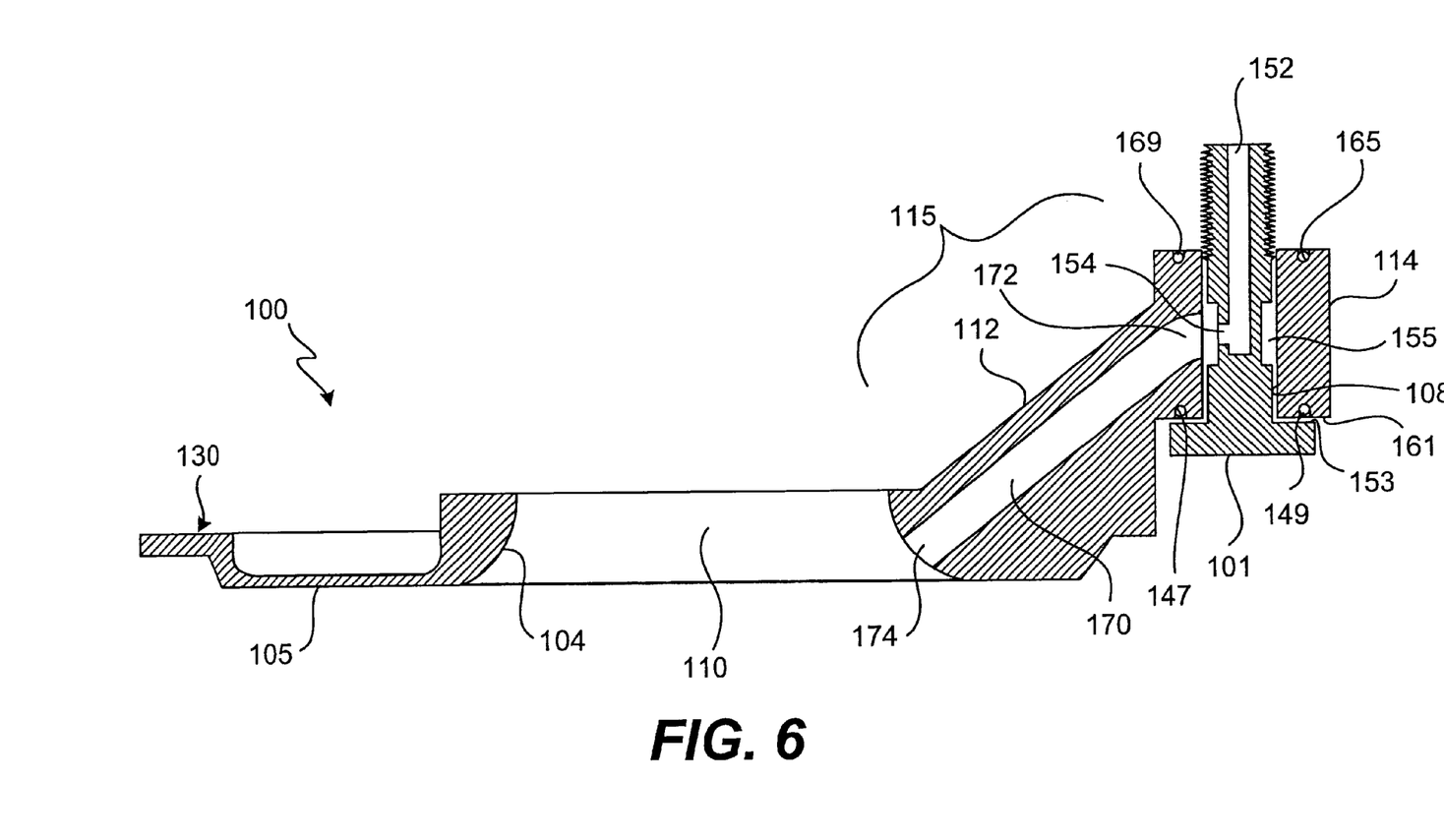
FIG. 6 is a side elevation view, in cross section, of the support member taken substantially along the plane of the line A—A in FIG. 5A, and illustrating a bolt member allowing flow communication therethrough.

FIGS. 5 and 6 best illustrate that each bolt alignment member 109, 114 is hollow, having respective bolt alignment passages 107, 108 extending therethrough from a bolt head contact surface 160, 161 to a land contact surface 140, 141. Threaded bolts 150 with a shaft diameter less than the inner diameter of the bolt alignment passages 107, 108 of the bolt alignment members 109, 114 and with bolt heads 101 with a diameter greater than the alignment passages may be used to secure the air cleaner support assembly 100 to the cylinder heads 12, 14 of engine 5 using the threaded communication ports 18, 20 in each cylinder head 12, 14.

As set forth above, the triangular-shaped support brackets 106, 112 of the flange members 113, 115 mount the respective bolt alignment members 109, 114 to the air cleaner support member 130. Further, as will be discussed in greater detail below, each support bracket defines a significant portion of the communication conduits 170, 171 extending from the bolt alignment members 109, 114 to the venturi portion 104. Accordingly, as best shown in FIG. 6, the blow-by gases from the crankcase 10 exit the communication ports 18, 20 of the cylinder heads 12, 14; enter the alignment passages 107, 108 through respective entrance ports 172, 173 thereof; and exit the corresponding communication conduits 170, 171 through exit ports 174, 175 strategically positioned at the venturi portion 104.

An upper surface 116 (See FIGS. 3 and 4) of the support brackets 106, 112 may be concave-shaped with a radius of curvature substantially similar to a radius of curvature of the circumferential surface 162 of the bolt alignment members 109, 114 for integral mounting thereto. The upper surface 116 extends into the air cleaner support surface 122 permitting the respective bolts 150 to be inserted through the bolt alignment passage 107, 108 of each bolt alignment member.

FIG. 2 illustrates that each spaced bolt alignment member 109, 114 is oriented and positioned along the air cleaner support member 130 such that when the bolt alignment members are seated against the lands 32, 33 of the respective cylinder heads, bolt alignment passages 107, 108 are coaxially aligned with the cylinder head communication ports 18, 20. Incidentally, it will be appreciated that the intake aperture 110 in the support member 130 will also be coaxially aligned with intake port 21 of the fuel system 22. When the alignment bolts 150 are tightened, each bolt alignment member is secured against the cylinder heads 12 and 14. A diameter of the bolt heads 101 is less than an outer diameter of the bolt alignment members 109, 114, allowing the bolts 150 to be tightened without adversely contacting the upper surfaces 116 of the support brackets 106, 112.

Each bolt alignment member 109, 114 includes a first face or land contact surface 140, 141 (see FIG. 5A) formed to contact and seat against an outer surface of the land 32, 33 or some other flat surface around the threaded communication ports 18, 20. When the threaded bolts 150 are inserted through the bolt alignment passage 107, 108 of each bolt alignment member 109, 114, and into the corresponding threaded communication ports 18, 20, the opposed surfaces engage and contact one another.

To provide a fluid seal at this joint between communication ports 18, 20 and the corresponding alignment passages 107, 108, a second seal device 148, 149 is disposed between the land contact surface 140, 141 and the surface of the land 32, 33. Accordingly, the blow-by gases of the crankcase will not vent into the environment from this joint. Preferably, the second seal device 148, 149 is provided by an O-ring 148, 149 encircling the corresponding bolt alignment passage 107, 108 at the land contact surface 140, 141. As shown in FIG. 5A, each land contact surface 140, 141 includes a circumferential outer edge and a circumferential inner edge and defines an annular groove 146, 147 between the outer edge and the inner edge. Prior to securing the bolt alignment members to the cylinder heads 12 and 14, the O-ring 148, 149 may be inset into the annular groove 146, 147. The O-ring 148, 149 and the annular groove 146, 147 are sized such that the O-ring protrudes above the apex of the land contact surface 140, 141. Therefore, when the alignment bolts 150 are inserted secured in the threaded communication ports 18, 20, the land contact surface 140, 141 contacts the land 32, 33 and the O-ring 148 is compressed into the annular groove 146, 147 forming a seal. The seal formed by the O-ring prevents blow-by gases vented from the communication ports 18 and 20 from escaping between any gaps where the land contact surface 140, 141 contacts the land 32.

While the O-ring 148, 149 and the annular groove 146, 147 have been described as being carried by the bolt alignment member 109, 114, it will be appreciated that they may be carried by the lands 32, 33 as well without departing from the true spirit and nature of the present invention.

Similar to the joint between the bolt alignment members and the lands, a first seal device 168, 169 is disposed between head contact surface 160, 161 and the head portion 101 of the bolts 150. Such a seal prevents blow-by gases vented from the communication ports 18 and 20 from escaping between any gaps where the bolt head portion 101 contacts the corresponding head contact surface 160, 161. As shown in FIG. 5B, the second face or head contact surface 160, 161 of each bolt alignment member 109, 114, includes an inner edge and an outer edge with an annular groove 164, 165 therebetween. The first seal device 168, 169 is also preferably provided by an O-ring which may be inserted into the corresponding annular groove 146, 147. The O-ring 168, 169 and annular groove 164, 165 are sized such that the O-ring protrudes above the top surface of the head contact surface 160, 161. The bolts 150 are designed such that an inner surface 153 of the bolt head portion 101 (See FIG. 6) contacts the head contact surface 160, 161, when the bolts 150 are used to attach the bolt alignment members 109, 114, as described above, to the threaded exit ports 18, 20 on the cylinder heads 12, 14. When the bolts 150 are tightened, the inner surface 153 of the bolt head 101 contacts the head contact surface 160, 161 and the O-ring 168, 169 is compressed, forming a seal thereby. Similar to the second seal device, these 0-rings prevent blow-by gases, which may contain residual oil and unburned fuel from escaping between any gaps where the head contact surface 160, 161 contacts the inner surface 153 of the bolts 150.

An advantage of the O-ring design of the present invention is that oil leaks are prevented at the interface where the air cleaner support assembly 65 is attached to the cylinder heads 12, 14. Other designs typically employ a conventional paper gasket or the like at this attachment interface which is more susceptible to leakage problems during normal use.

To provide flow communication from the communication ports 18, 20 of the cylinder heads 12, 14 to the entrance ports 172, 173 of the communication conduits 170, 171, when the bolts 150 are secured in the bolt alignment passages 164, 165, each bolt 150 includes a flow passage 151 (see FIG. 6) counter-bored into a distal end of the shaft of the bolt. The longitudinally extending flow passage 151 includes a first opening 152 at the distal end of the bolt 150, and an opposite second opening 154 terminating at a side portion of the bolt shaft. Thus, when the hollow bolts 150 are attached to the threaded communication ports 18, 20, the flow passages 151 provide a flow communication path between the entrance ports 172, 173 of the communication conduits 170, 171 and the exit ports 18, 20 of the cylinder heads 12, 14. This allows the blow-by gases to enter the hollow bolt 150 and exit via the second opening 154.

FIG. 6 illustrates that the second opening 154 into the flow passage 151 of the shaft is positioned at a bottom portion of an annular channel 155 extending circumferentially around the shaft. When the bolts 150 are threaded into the corresponding communication ports 18, 20 until the inner surface of the bolt heads 153 forcibly contact the head contact surface 160 of the bolt alignment members 109, 114, sealing the corresponding O-rings 148, 168 and 148, 149, the annular groove will be strategically positioned to enable flow communication with the entrance port 172, 173 of the corresponding communication conduit 170, 171. Hence, blow-by gasses exiting the second opening 154 of the flow passage 151 in the bolts 150 flows into the fill the annular channel 155, and enters into communication conduit 170, 171 in each bracket 106, 112. An advantage of the annular groove design is that the second opening 154 of the flow passage does not have to precisely align the entrance ports 172, 173 of communication conduits 170, 171 for passage of the blow-by gases.

The entrance ports 172, 173 of the communication conduits 170, 171 terminate at alignment passages 164, 165 of the hollow bolt alignment members 109, 114, while the opposite and exit ports 173, 174 terminate at the face of the venturi air intake 104. In the present embodiment, the communication conduits 170, 171 are relatively linear having a longitudinal axis, extending through the support brackets 106, 112, which preferably intersects the longitudinal axis of the corresponding bolt alignment passage 107, 108 at an angle of between about 30° to about 60°, and more preferably about 45°. A cross section of one communication conduit 170, bracket 112, the hollow bolt alignment member 114 and the support member 130 is depicted in FIG. 6.

Figure 3:
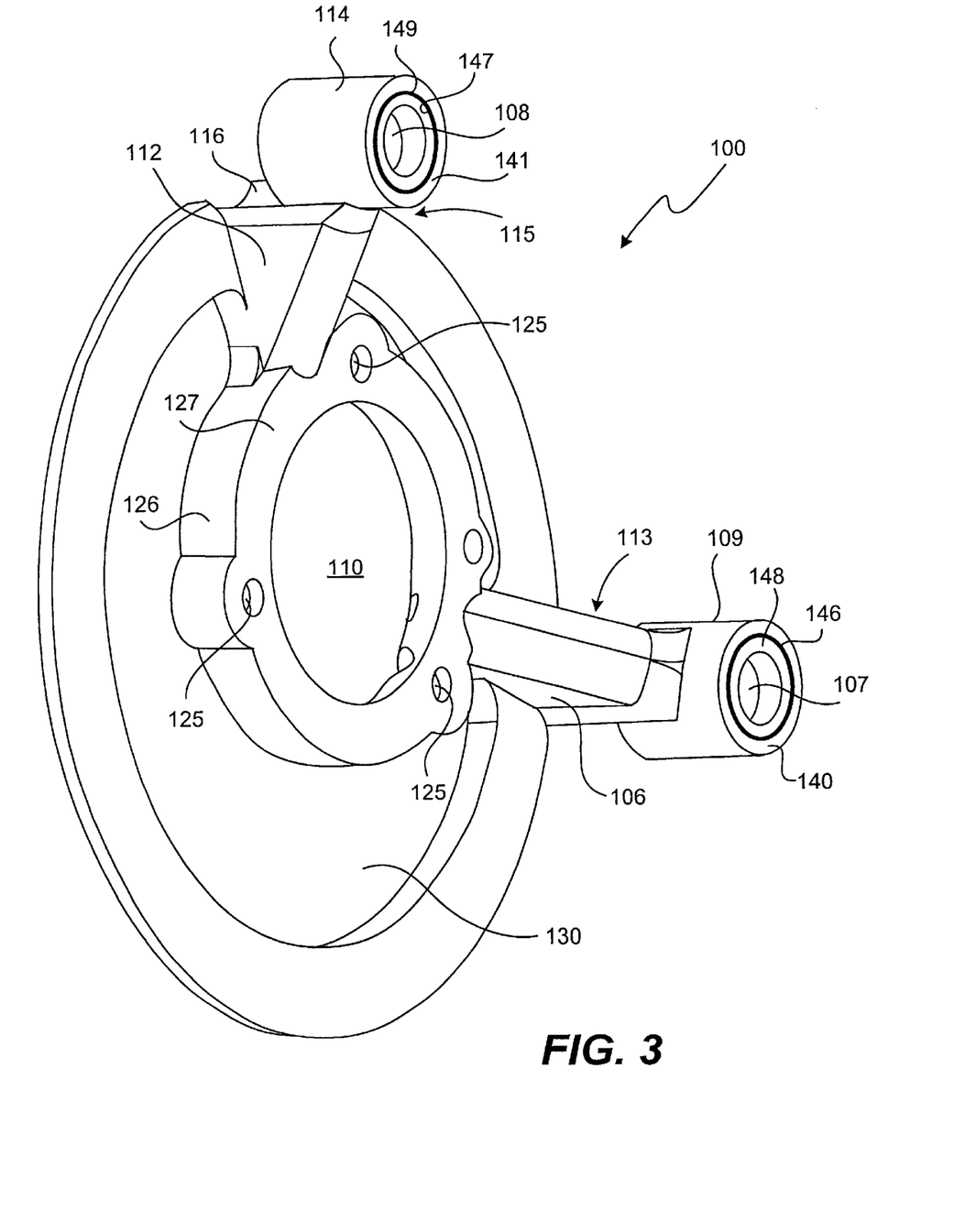
FIG. 3 is an enlarged, rear perspective view of a first side of a support member of the present invention.
Figure 4:
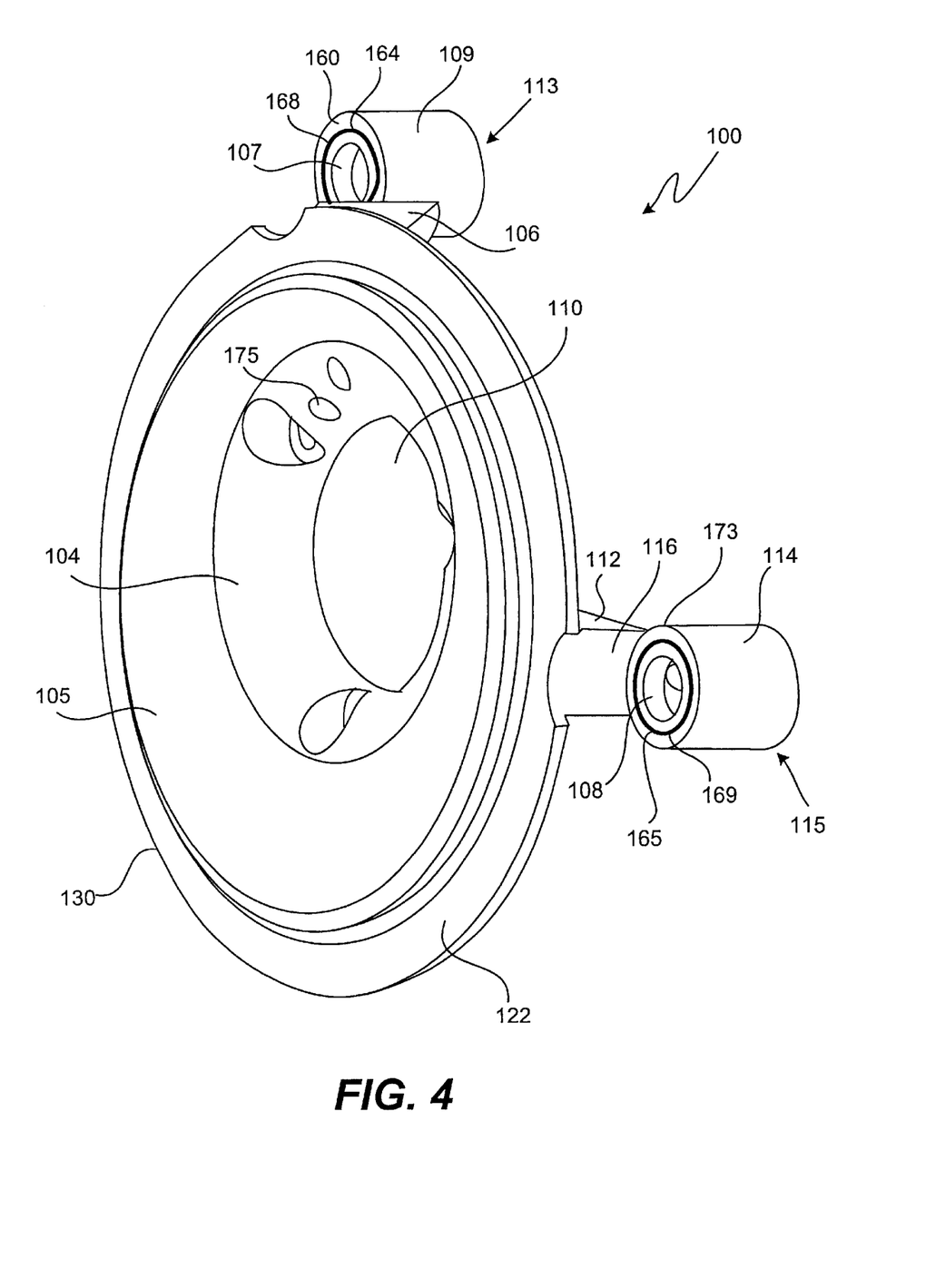
FIG. 4 is a front perspective view of a second side of the support member of FIG. 3.

The venturi air intake portion 104 tapers inwardly from a front facing raised shoulder 105 (See FIGS. 2 and 4) of the air cleaner support member 130 to rear facing contact surface 127 of a manifold contact plate 126 (see FIG. 3). The contact surface 127 of the manifold contact plate 126 is facing toward the crankcase when the support member 130 is secured to the engine 5. The venturi air intake 104 causes a venturi effect to accelerate the air flow through the aperture 110 of the support member 130 and into the intake port 21 of the fuel system 22 of the engine 5. During operation, accordingly, the blow-by gases vented into the venturi air intake 104 may be mixed with outside air filtered through the air filter 42.

In accordance with the present invention, the communication conduits 170, 171 provide a relatively direct communication path for the blow-by gases from the cylinder head communication ports 18, 20 to the venturi air intake 104 and into the aperture 110 in the support member 130. Blow-by gases from each communication port 18, 20 are independently vented into the aperture 110 at the communication conduit exit ports 174, 175. In contrast, some breather systems combine the blow-by gases from each cylinder head exit port using a single exit port terminating at the air filter 42. These breather systems, which vent the gases into the air filter, require more components and increase the collective length of the flow passages from the cylinder head exit ports. Consequently, manufacturing costs are increased as compared to the present invention. Additionally, in many current breather systems, the longer vent channels are provided by rubber hoses which are less durable then the maintenance free communication conduits of the present invention.

Another advantage of the present invention is that the blow-by gases from each exit port 18, 20 are vented into the aperture 110 through the support member 130. Compared to the current designs, potential fouling of the air filter 42 by the blow-by gases is substantially decreased, thus reducing the maintenance of the air filter 42.

A plurality of support bolts 102 may be inserted through a plurality of bolt alignment holes 125 in the manifold contact plate 126 and the raised shoulder 105. The support bolts 102 may be used to secure the air filter 42 to the support member 130 using a plurality of bolt alignment holes 120 in the air filter 42. Outer surfaces of the air filter 42 abut against the air cleaner support surface 122 such that the raised shoulder extends into the air filter 42. An air cleaner cover 44 may be placed over the air filter 42 and in contact with the air cleaner support surface 122. An attachment device may extend through the center of the air cleaner cover 44, the air filter 42 and the air cleaner support assembly 65, and into the engine 5, to attach the air cleaner cover 44 to the engine 5. In another embodiment, an attachment device may be inserted through one of the bolt alignment holes 125 to secure the support member 130 directly to the carburetor 22.

When the air cleaner support assembly is secured using one of the attachment devices described above, it is urged toward the carburetor 22. A gasket may be disposed between the top surface of the manifold contact plate 127 and the carburetor 22 providing a seal between the manifold contact plate 127 and the carburetor 22. The seal is designed to prevent the mixture of air and blow-by gases from escaping between any gaps between the manifold contact plate and a top surface of the carburetor around the carburetor throat 23.

Figure 7:
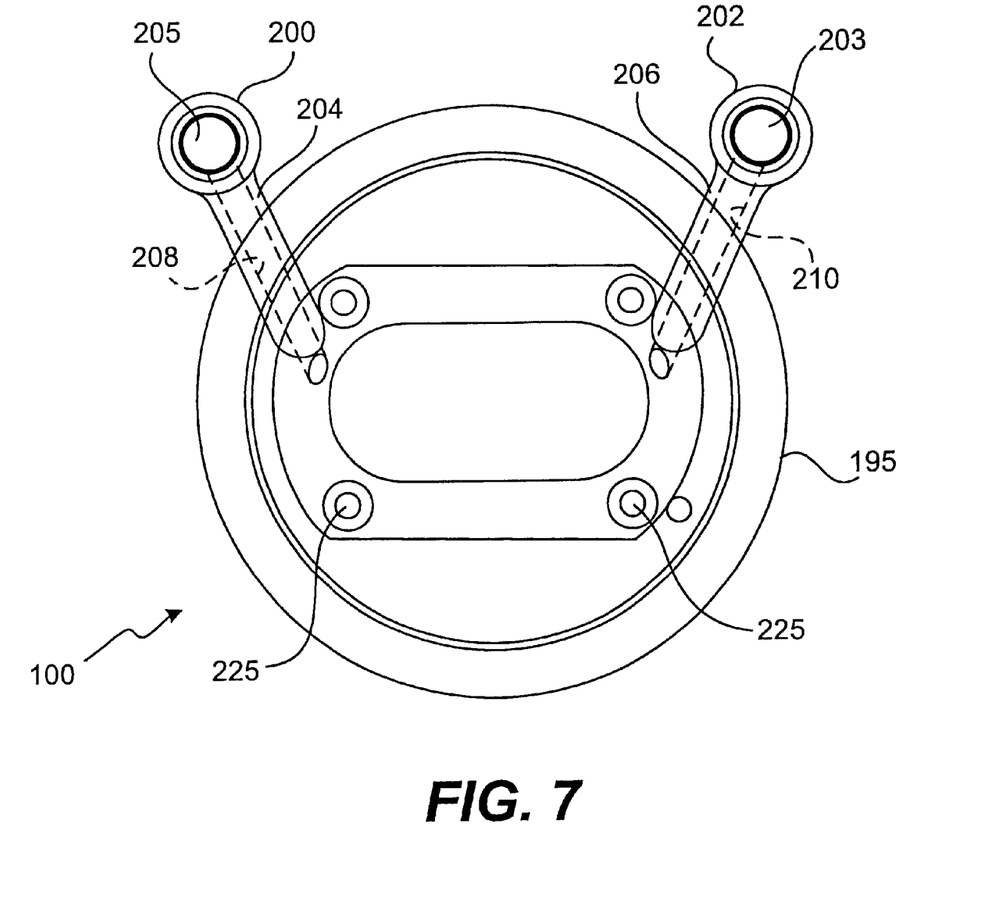
FIG. 7 is a front elevation view of a first side of an alternative embodiment support member that interfaces with a two cylinder motorcycle engine employing a fuel injection system.

FIG. 7 is a plan view of a first side of a support member 195 that interfaces with a two cylinder motorcycle engine employing a fuel injection system in another embodiment of the present invention. Two hollow bolt alignment members 200, 202 are integrally connected to the support member 195 using brackets 204 and 206. The brackets 204, 206 include conduits 208, 210 that allow communication between apertures 203, 205, in each hollow bolt alignment member 202, 204 and a venturi air intake 220. The venturi intake 220 is substantially oval shaped to match an air intake for an engine employing a fuel injection system. Using hollow bolts, as described above, inserted through the bolt alignment members 200, 202 and an attachment means inserted through a plurality of bolt alignment holes 225, the support member 195 with an air filter and air cleaner cover may be secured to the engine and cylinder heads and operate in the manner described above for the air cleaner support assembly 100. For instance, as described above, blow-by gases from exit ports in the cylinder heads are injected into the oval shaped venturi air intake 220 . Within the oval shaped venturi air intake 220, blow-by gases and air from the air filter are mixed prior to entering the engine where the mixture is mixed with fuel and burnt.

Although the foregoing invention has been described in some detail for purposes of clarity of understanding, it will be apparent that certain changes and modifications may be practiced within the scope of the appended claims. For instance, the venturi air intakes of the present invention have been shown with a circular or ovular cross sections. The cross section of the air intake may be re-shaped to match of the cross section of the air intake on the engine where the air cleaner support assembly backing plate and breather system is employed.

What is claimed is:

1. An air cleaner base assembly for a motorcycle engine including at least one cylinder head having a communication port for venting a crankcase, an air cleaner and an air intake port of a fuel system, said base assembly comprising:

an air cleaner support member having a first side positioned adjacent the air intake port and an opposite second side adapted to seat the air cleaner thereto, said support member further including a venturi portion defining an intake aperture extending from the second side to the first side, and having a transverse cross-sectional dimension substantially similar to that of the air intake port of the fuel system for air flow from the air filter, through the intake aperture and into the air intake port; and a flange member mounted to the support member, and adapted to mount said support member to the cylinder head, said flange member defining a communication conduit extending therethrough, and having an entrance port in flow communication with the communication port of the cylinder head and an opposite exit port terminating at the venturi portion.

2. The air cleaner base assembly of claim 1, wherein said flange member further defines a bolt alignment passage formed for coaxial alignment with the communication port of the cylinder head when mounted thereto, said base assembly further including:

a bolt member extending through said bolt alignment passage and said communication port to mount said air cleaner support member to the cylinder head.

3. The air cleaner base assembly of claim 2, wherein said communication conduit of said flange member intersects said bolt alignment passage at said entrance port thereof.

4. The air cleaner base assembly of claim 3, wherein said bolt member is configured to enable fluid communication between the communication port of the cylinder head and the entrance port of the communication conduit of the flange member.

5. The air cleaner base assembly of claim 4, wherein said bolt member includes a flow passage extending through a shaft portion thereof to provide flow communication between the communication port and the entrance port.

6. The air cleaner base assembly of claim 5, wherein said flow passage of the bolt member includes a first opening terminating at a distal end of said shaft, and a second opening terminating at a side portion of said shaft proximate the communication conduit entrance port when said base assembly is mounted to the cylinder head.

7. The air cleaner base assembly of claim 3, wherein the longitudinal axis of said communication conduit intersects the longitudinal axis of the bolt alignment passage at an angle of between about 30° to about 60°.

8. The air cleaner base assembly of claim 7, wherein said angle is about 45°.

9. The air cleaner base assembly of claim 2, wherein said flange member includes a bolt contact surface surrounding one end of the bolt alignment passage, and formed to forcibly engage a head portion of the bolt member during said mount, said base assembly further including:

a first seal device cooperating with the head portion of the bolt and the contact surface to form a fluid tight seal therebetween during said mount.

10. The air cleaner base assembly of claim 9, wherein said first seal device is provided by an O-ring disposed in an annular groove inset in said bolt contact surface and encircling the one end of said alignment bolt passage.

11. The air cleaner base assembly of claim 9, wherein said flange member further includes a cylinder head contact surface surrounding an opposite end of the bolt alignment passage, and formed to forcibly engage a sealing surface of the cylinder head during said mount, said base assembly further including:

a second seal device cooperating with the cylinder head contact surface and the sealing surface of the cylinder head to form a fluid tight seal therebetween during said mount.

12. The air cleaner base assembly of claim 11, wherein said first seal device is provided by an O-ring disposed in an annular groove inset in said bolt contact surface and encircling the one end of said alignment bolt passage, and said second seal device is provided by an O-ring disposed in an annular groove inset in said cylinder head contact surface and encircling the opposite end of said alignment bolt passage.

13. The air cleaner base assembly of claim 1, further including:

a second flange member, spaced-apart from the first named flange member, mounted to the support member, and adapted to mount said second support member to a second cylinder head of the motorcycle, said second flange member defining a communication conduit extending therethrough, and having an entrance port in flow communication with a communication port of the second cylinder head for venting the crankcase, said communication conduit further including an opposite exit port terminating at the venturi.

14. The air cleaner base assembly of claim 13, wherein each flange member further defines a respective bolt alignment passage formed for coaxial alignment with the corresponding communication port of the corresponding cylinder head when mounted thereto, said base assembly further including:
a respective bolt member extending through the respective bolt alignment passage and respective communication port to mount said air cleaner support member to the respective cylinder head.

15. The air cleaner base assembly of claim 14, wherein each communication conduit of the respective flange member intersects the respective bolt alignment passage at the respective entrance port thereof.

16. The air cleaner base assembly of claim 15, wherein each bolt member is configured to enable fluid communication between the respective communication port of the respective cylinder head and the entrance port of the communication conduit of the respective flange member.

17. The air cleaner base assembly of claim 15, wherein the longitudinal axis of the respective communication conduit intersects the longitudinal axis of the respective bolt alignment passage at an angle of between about 30° to about 60°.

18. The air cleaner base assembly of claim 13, wherein each flange member includes a bolt contact surface surrounding one end of the respective bolt alignment passage, each bolt contact surface being formed to forcibly engage a head portion of the respective bolt member during said mount, said base assembly further including:
a respective first seal device cooperating with the respective head portion of the corresponding bolt member and the respective contact surface to form a fluid tight seal therebetween during said mount.

19. The air cleaner base assembly of claim 18, wherein each flange member further includes a respective cylinder head contact surface surrounding an opposite end of the respective bolt alignment passage, each cylinder head contact surface being formed to forcibly engage a respective sealing surface of the respective cylinder head during said mount, said base assembly further including:
a respective second seal device cooperating with the respective cylinder head contact surface and the respective sealing surface of the corresponding cylinder head to form a fluid tight seal therebetween during said mount.

20. A combination backing plate and crankcase breather assembly for a motorcycle engine having at least a first and a second cylinder, a cylinder head mounted on each cylinder, means for connecting the cylinder heads to the crankcase for venting the crankcase through an exit port on each cylinder head, an air intake port of a fuel system and an air cleaner, said assembly comprising:
a support member having a first side adapted to mount to the engine air intake, and an opposite second side adapted to seat the air cleaner thereto, said support member including a venturi portion defining a centrally disposed intake aperture with a transverse cross-sectional shape substantially identical to a transverse-cross-sectional shape of the engine air intake, securing structure configured to secure the air cleaner to the support member;

a pair of flange members each integrally connected to said support member and formed to mount the assembly to the cylinder heads, each integrally connected to one hollow bolt alignment member, each flange member defining a respective communication conduit extending therethrough, and each communication conduit having an entrance port in flow communication with a respective communication port of the corresponding cylinder head and an opposite exit port terminating at the venturi portion such that each communication conduit vents gases from the crankcase through the exit ports of the respective cylinder head to the corresponding exit port at the venturi portion;

a pair of hollow bolt members each adapted to releasably mount a respective flange member to the corresponding cylinder head, each bolt member including a flow passage coaxially aligned with the corresponding exit port of cylinder head when the bolt member is fastened in the respect exit port; and respective sealing devices cooperating with at least one of the respective hollow bolt members and the respective flange members to fluid seal the respective communication conduit to the respective exit port.

* * * * *